United States Patent
Muhammad

(10) Patent No.: US 12,002,488 B2
(45) Date of Patent: Jun. 4, 2024

(54) INFORMATION PROCESSING APPARATUS AND INFORMATION PROCESSING METHOD

(71) Applicant: Rakuten Group, Inc., Tokyo (JP)

(72) Inventor: Aqmar Muhammad, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 109 days.

(21) Appl. No.: 17/548,743

(22) Filed: Dec. 13, 2021

(65) Prior Publication Data

US 2022/0207865 A1    Jun. 30, 2022

(30) Foreign Application Priority Data

Dec. 25, 2020    (JP) .................................. 2020-216626

(51) Int. Cl.
| | | |
|---|---|---|
| *G11B 20/10* | (2006.01) | |
| *G06F 3/00* | (2006.01) | |
| *G06F 16/35* | (2019.01) | |
| *G06N 7/01* | (2023.01) | |
| *G06V 10/77* | (2022.01) | |
| *G06V 10/774* | (2022.01) | |
| *G06V 10/84* | (2022.01) | |

(52) U.S. Cl.
CPC .......... *G11B 20/10379* (2013.01); *G06F 3/00* (2013.01); *G06F 16/35* (2019.01);
(Continued)

(58) Field of Classification Search
CPC ..... G11B 20/10379; G06F 3/00; G06F 16/35; G06F 16/355; G06F 18/214; G06F 18/24;
(Continued)

(56) References Cited

U.S. PATENT DOCUMENTS

2016/0070986 A1    3/2016   Chidlovskii et al.
2016/0078359 A1*   3/2016   Csurka ................. G06V 10/776
                                                       706/12
(Continued)

FOREIGN PATENT DOCUMENTS

EP    2 993 618 A1    3/2016
JP    2016-058079 A   4/2016

OTHER PUBLICATIONS

Zhang et al, Learning Likelihood Estimates for Open Set Domain Adaptation, 2020, IEEE International Conference on Multimedia and Expo, pp. 1-6. (Year: 2020).*

(Continued)

*Primary Examiner* — John Villecco
*Assistant Examiner* — Kathleen M Broughton
(74) *Attorney, Agent, or Firm* — Sughrue Mion, PLLC

(57) ABSTRACT

Disclosed herein is an information processing apparatus, comprising: a feature extraction unit configured to extract features from a sample of a first class and a sample of a second class contained in a source domain and a sample of the first class contained in a target domain, respectively; a pseudo-sample generation unit configured to generate pseudo-samples of the second class in the target domain based on a distribution of samples of the first class contained in the target domain in a feature space of the features extracted by the feature extraction unit; and a data transformation unit configured to perform data transformation in the feature space by machine learning such that a distribution of samples of the first class and samples of the second class contained in the source domain approximates a distribution of samples of the first class and the pseudo-samples of the second class in the target domain.

9 Claims, 9 Drawing Sheets

(52) U.S. Cl.
CPC ............. *G06N 7/01* (2023.01); *G06F 16/355* (2019.01); *G06V 10/7715* (2022.01); *G06V 10/7747* (2022.01); *G06V 10/84* (2022.01)

(58) Field of Classification Search
CPC .......... G06N 7/01; G06N 3/045; G06N 20/00; G06N 3/08; G06N 5/04; G06V 10/7715; G06V 10/7747; G06V 10/84
See application file for complete search history.

(56) References Cited

U.S. PATENT DOCUMENTS

| | | | | |
|---|---|---|---|---|
| 2016/0253597 | A1* | 9/2016 | Bhatt | G06N 20/00 706/12 |
| 2017/0147944 | A1* | 5/2017 | Csurka | G06N 3/02 |
| 2017/0161633 | A1* | 6/2017 | Clinchant | G06N 20/00 |
| 2018/0039906 | A1* | 2/2018 | Bhatt | G06N 20/00 |
| 2020/0130177 | A1* | 4/2020 | Kolouri | G06N 3/045 |

OTHER PUBLICATIONS

Corbiere et al, Confidence Estimation via Auxiliary Models, 2020, arXiv:2012.06508v1 IEEE Transactions on Pattern Analysis and Machine Intelligence, pp. 1-21. (Year: 2020).*

Zhao et al, Deep Joint Discriminative Feature Learning and Class-Aware Domain Alignment for Unsupervised Domain Adaptation, 2020, 7th International Conference on Signal Processing and Integrated Networks, pp. 1-6. (Year: 2020).*

Tanwani, "DIRL: Domain-Invariant Representation Learning for Sim-to-Real Transfer", 4th Conference on Robot Learning (CoRL 2020), Cambridge MA, USA, Nov. 15, 2020 (14 pages total).

* cited by examiner

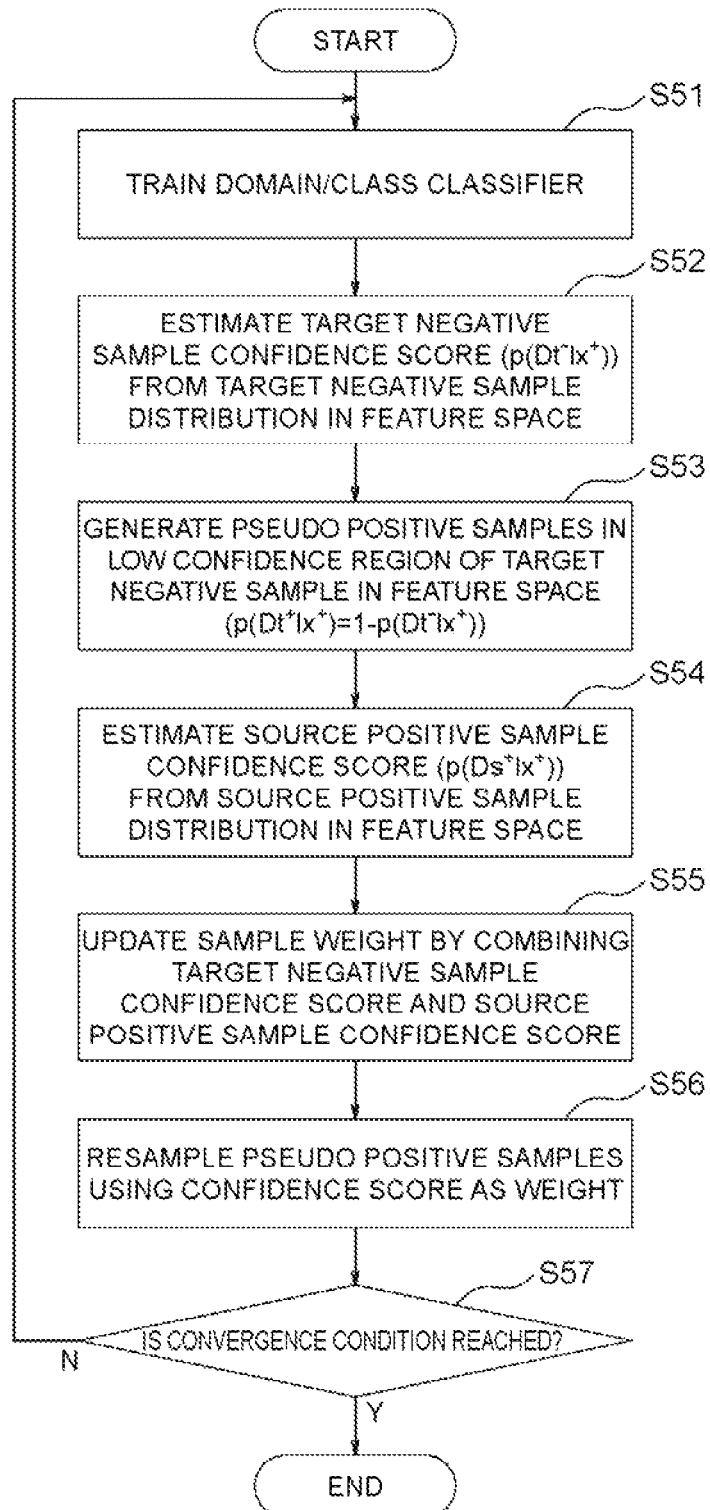

INFORMATION PROCESSING APPARATUS AND INFORMATION PROCESSING METHOD

CROSS-REFERENCE TO RELATED APPLICATIONS

This application is related to and claims priority under 35 U.S.C. 119 (a) to Japanese patent application No. 2020-216626, filed on Dec. 25, 2020, of which disclosure including the specification, drawings and abstract is incorporated herein by reference in its entirety.

TECHNICAL FIELD

The present invention relates to an information processing apparatus and an information processing method, and more particularly, to a technique for training a learning model by machine learning.

BACKGROUND ART

In a supervised machine learning, a teacher data set consisting of teacher samples and teacher labels is used to train a learning model by machine learning such that the relationship between the teacher samples and the teacher labels are reflected to the learning model. The learned model obtained by such machine learning is then applied to unknown samples that are not labeled in the inference phase to obtain the desired processing results, for example, image recognition, classification and the like.

When a learned model that has been trained using a certain teacher data set is directly applied to a task that targets a data set having a domain different from that of the teacher data set, the accuracy of the inference is likely to be deteriorated. Here, a domain refers to a type, a range, a distribution, and the like of data in a data set.

To cope with this proposition, there is a technique to make the learned model applicable to a target domain, which is the same domain as a target data set, by further training the learned model by machine learning using samples of the target domain. This technique is called "transfer learning".

One of those transfer learning methods is so-called "domain adaptation". In this domain adaptation, assuming that the distribution of samples differs between a domain of the teacher data set and a domain of the target data set, the learning model is trained to bring the distribution of the domain of the teacher data set (i.e., source domain), which is the application source, closer to the distribution of the domain of the target data set (i.e., target domain), which is the application target.

Patent Literature 1 (Laid-open Publication of Japanese Patent Application No. 2016-58079 A) discloses a certain domain adaptation method for a task of classifying vehicle images captured by a camera.

More particularly, in the labeling system disclosed in the Patent Literature 1, labeled feature vectors representing images acquired by the same camera are used as a target domain training set and labeled feature vectors representing images acquired by a plurality of other cameras, respectively, are used as a plurality of source domain training sets to train the boosting classifier such that the deviation between domains is learned. This allows the boosting classifier to classify the vehicle images using images collected by cameras introduced earlier or installed at other locations.

LISTING OF REFERENCES

Patent Literature

PATENT LITERATURE 1: Laid-open Publication of Japanese Patent Application No. 2016-58079 A

SUMMARY OF THE INVENTION

Problems to Be Solved by the Invention

Meanwhile, in the domain adaptation, although the teacher samples contained in the source domain are labeled, the target data samples contained in the target domain are not necessarily labeled. Domain adaptation when the samples in the target domain are unlabeled is also referred to as "unsupervised domain adaptation".

In any case, in the domain adaptation, the target domain is assumed to contain samples that correspond to all labels attached to samples belonging to the source domain.

However, it is not always possible to prepare samples corresponding to all the labels of the source domain as samples of the target domain. Thus, when the target domain lacks samples corresponding to a part of the labels attached to the samples belonging to the source domain, the technique disclosed in Patent Literature 1 cannot bring the sample distribution of the source domain sufficiently close to the sample distribution of the target domain even when the source domain is domain-adapted to the target domain.

For this reason, the accuracy of the domain adaptation to the learned model is likely to be deteriorated, which in turn may deteriorate the accuracy of various processes that use the learned model for inference.

The present invention has been made in order to solve the above mentioned problems and an object thereof is to provide an information processing apparatus and an information processing method capable of obtaining highly accurate processing results even when the samples in the target domain do not sufficiently correspond to the samples in the source domain.

Solution to Problems

In order to solve the above mentioned problems, according to one aspect of the present invention, there is provided an information processing apparatus, comprising: at least one memory configured to store program code; and electric circuitry including at least one of a field programmable gate array (FPGA), an application specific integrated circuit (ASIC), and at least one processor, the at least one processor being configured to read and operate according to the program code, the electronic circuitry configured to: extract features from a sample of a first class and a sample of a second class contained in a source domain and a sample of the first class contained in a target domain, respectively; generate pseudo-samples of the second class in the target domain based on a distribution of samples of the first class contained in the target domain in a feature space of the extracted features; and perform data transformation in the feature space by machine learning such that a distribution of samples of the first class and samples of the second class contained in the source domain approximates a distribution of samples of the first class and the pseudo-samples of the second class contained in the target domain.

The pseudo-sample generation unit may estimate a first confidence score of the distribution of samples of the first class contained in the target domain in the feature space, and generate the pseudo-samples based on a gradient of the estimated first confidence score.

The pseudo-sample generation unit may generate the pseudo-samples in a region of the feature space where the estimated first confidence score is low.

The pseudo-sample generation unit may estimate a second confidence score of the distribution of samples of the second class contained in the source domain in the feature space, and generate the pseudo-samples based on a gradient of the estimated second confidence score.

The pseudo-sample generation unit may combine the first confidence score and the second confidence score, and resample the generated pseudo-samples based on a combined confidence score so as to distribute the combined pseudo-samples in a region having a higher combined confidence score in the feature space.

The pseudo-sample generation unit may generate the pseudo-samples based on a distance in the feature space between the distribution of samples of the first class and the distribution of samples of the second class contained in the source domain.

The information processing apparatus may further comprise: a domain classifier configured to classify a sample into one of the source domain and the target domain, wherein the pseudo-sample generation unit may train the domain classifier to assign a higher weight to the sample classified in the target domain than to the sample classified in the source domain.

The information processing apparatus may further comprise: a class classifier configured to classify a sample into one of the first class and the second class, wherein the pseudo-sample generation unit may train the class classifier to assign a higher weight to the sample classified in the second class than to the sample classified in the first class.

The data transformation unit may train at least one of the domain classifier and the class classifier by machine learning such that a cross entropy loss in the feature space, which is calculated using a first loss function, becomes smaller.

The data transformation unit may perform machine learning such that a Wasserstein distance between the source domain and the target domain in the feature space, which is calculated using a second loss function, becomes smaller.

According to another aspect of the present invention, there is provided an information processing method executed by an information processing apparatus, comprising: extracting features from a sample of a first class and a sample of a second class contained in a source domain and a sample of the first class contained in a target domain, respectively; generating pseudo-samples of the second class in the target domain based on a distribution of samples of the first class contained in the target domain in a feature space of the extracted features; and performing data transformation in the feature space by machine learning such that a distribution of samples of the first class and samples of the second class contained in the source domain approximates a distribution of samples of the first class and the pseudo-samples of the second class contained in the target domain.

According to yet another aspect of the present invention, there is provided an information processing computer program product for causing a computer to execute information processing, the computer program product causing the computer to execute processing comprising: a feature extraction process for extracting features from a sample of a first class and a sample of a second class contained in a source domain and a sample of the first class contained in a target domain, respectively; a pseudo-sample generation process for generating pseudo-samples of the second class in the target domain based on a distribution of samples of the first class contained in the target domain in a feature space of the features extracted by the feature extraction process; and a data transformation process for performing data transformation in the feature space by machine learning such that a distribution of samples of the first class and samples of the second class contained in the source domain approximates a distribution of samples of the first class and the pseudo-samples of the second class contained in the target domain.

Advantageious Effect of the Invention

According to the present invention, it makes it possible to obtain highly accurate processing results even when the samples in the target domain do not sufficiently correspond to the samples in the source domain.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 5 is a flowchart showing an exemplary detailed processing procedure of the pseudo-sample generation processing performed by the pseudo-sample generation unit of the learning apparatus according to the present embodiment.

DESCRIPTION OF EMBODIMENTS

Figure 1:
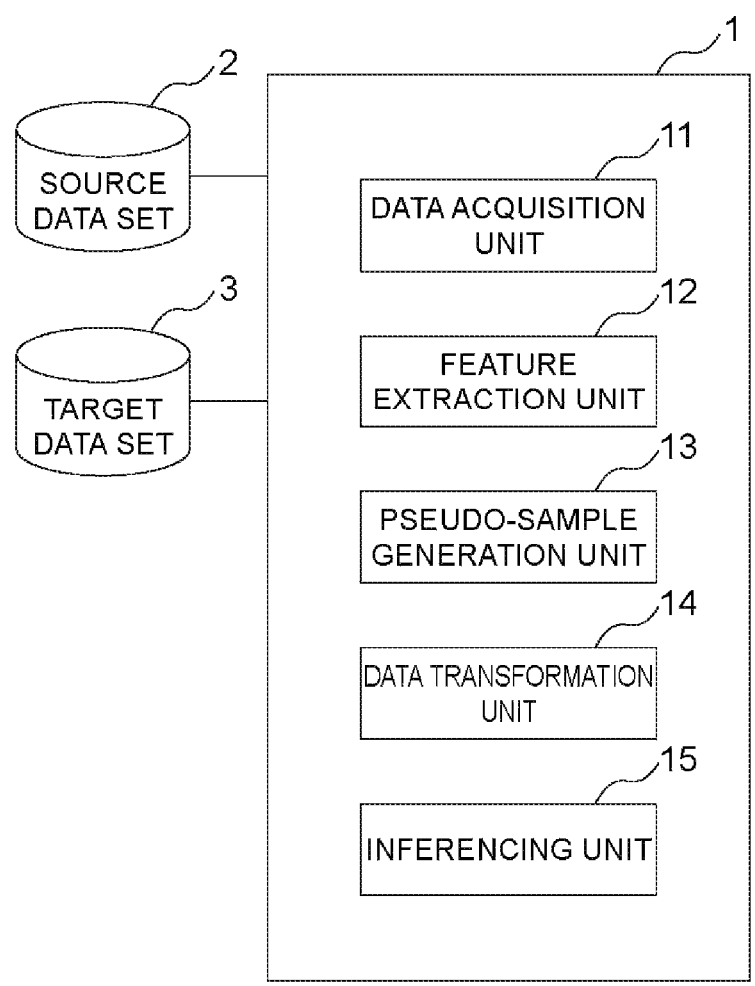
FIG. 1 is a block diagram showing an exemplary functional configuration of a learning apparatus according to an embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

A learning apparatus according to the present embodiment extracts features of samples of a source domain and samples of a target domain, respectively, and generates pseudo-samples in a region of the target domain in a feature space. Each of the pseudo-sample is a sample having a label (i.e., class) that is not sufficiently contained in the target domain among the plurality of labels (classes) assigned to the samples of the source domain. The generated pseudo-samples are then used to supplement the samples in the target domain.

The learning apparatus according to the present embodiment also performs machine learning such that the source domain domain-adapts to the target domain in which the pseudo-samples are supplemented. Hereinafter throughout the present disclosure, each of the source domain and the target domain contains one or more samples.

Hereinafter, a certain example in which the present embodiment is applied to, for example, an application for recognizing and classifying images will be described. However, the present embodiment is not limited to this application, and can be applied to any kind of data or domain, depending on the application to which the learning model is to be applied.

Functional Configuration of Learning Apparatus

FIG. 1 is a block diagram showing an exemplary functional configuration of a learning apparatus 1 according to the present embodiment.

The learning apparatus 1 shown in FIG. 1 includes a data acquisition unit 11, a feature extraction unit 12, a pseudo-sample generation unit 13, a data transformation unit 14, and an inferencing unit 15.

The learning apparatus 1 may be communicably connected to a client device (not shown) configured by a PC (Personal Computer) or the like via a network. In this case, the learning apparatus 1 is implemented in a server, and the client device may provide a user interface for the learning apparatus 1 to perform information input and output to and from the outside and may also include some or all of the components 11 to 15 of the learning apparatus 1.

The data acquisition unit 11 acquires samples of the source domain from the source data set 2 and samples of the target domain from the target data set 3, respectively, and supplies the acquired samples of the source domain and samples of the target domain to the feature extraction unit 12.

The source data set 2 is configured by a non-volatile storage device such as an HDD (Hard Disk Drive), an SSD (Solid State Drive), or the like, and stores samples belonging to the source domain serving as a domain adaptation source. The samples belonging to the source domain are referred to as source samples. The source samples are the teacher data for pre-training the learning model, and each source sample is labeled with a class that indicates the correct answer in the classification.

Similarly to the source data set 2, the target data set 3 is configured by a non-volatile storage device such as an HDD, an SSD, or the like, and stores samples belonging to the target domain serving as a domain adaptation target. The samples belonging to the target domain are referred to as target samples. A target sample is a sample that belongs to the same domain as the data to be processed by a task to which the learning model is to be applied, and each target sample may be, but may not necessarily be, labeled with a class.

It should be noted that a domain refers to a region to which data generated from a single probability distribution belongs. For example, a domain is configured by attributes such as a type, a range, and a distribution of the data.

The data acquisition unit 11 may acquire the source samples and the target samples by reading the source samples previously stored in the source data set 2 and the target samples previously stored in the target data set 3, or may receive the source samples and the target samples from the same or different opposing devices storing the source samples and the target samples via the communication I/F.

The data acquisition unit 11 also accepts input of various parameters necessary for performing the machine learning processing of the domain adaptation in the learning apparatus 1. The data acquisition unit 11 may accept the input of the various parameters via a user interface of the client device communicably connected to the learning apparatus 1.

The feature extraction unit 12 extracts a feature of each source sample from the source samples supplied from the data acquisition unit 11.

The feature extraction unit 12 also extracts a feature of each target sample from the target samples supplied from the data acquisition unit 11.

The feature extraction unit 12 supplies the extracted source sample features and target sample features to the pseudo-sample generation unit 13.

Based on the features of the source samples and the target samples supplied from the feature extraction unit 12, the pseudo-sample generation unit 13 generates, as pseudo-samples, target samples of a class that do not appear or are insufficient in number in the target samples of the target domain.

According to the present embodiment, the pseudo-sample generation unit 13 maps the features of the source samples and the target samples supplied from the feature extraction unit 12 onto the feature space, estimates the confidence score of the distribution of the target samples in the feature space, and generates pseudo-samples based on the estimated confidence score, thereby supplementing the target samples in the target domain. The pseudo-sample generation unit 13 may further estimate the confidence score of the distribution of the source samples in the feature space and generate pseudo-samples based on the estimated confidence score.

The details of the pseudo-sample generation processing performed by the pseudo-sample generation unit 13 will be described later with reference to FIG. 5.

The data transformation unit 14 performs data transformation such that the distribution of features of the source samples in the source domain supplied from the feature extraction unit 12 matches or approximates the distribution of features of the target samples in the target domain. In other words, the data transformation unit 14 performs the domain adaptation, which takes the features of the source samples and the features of the target samples as inputs and transforms the teacher data to be learned by the learning model from the data of the source domain to the data of the target domain.

According to the present embodiment, the data transformation unit 14 supplements the target domain with the pseudo-samples generated by the pseudo-sample generation unit 13 and performs the domain adaptation from the source domain to the target domain using the features of the target samples of the target domain which is supplemented with the pseudo-samples as an input.

The data transformation unit 14 uses the transformed teacher data (i.e., training data) to machine learn the parameter values of the function of the domain adaptation in the learning model.

The inferencing unit 15 outputs various processing results with respect to the input data by means of a learned learning model to which the domain adaptation has been applied by the data transformation unit 14.

In such a machine-learned leaning model, the target samples generated as the pseudo-samples in the target domain have supplemented the target samples of the non-appearing class, thereby effectively preventing the loss of accuracy in various inferencing processing.

Domain Adaptation and Pseudo-Sample Generation

Figure 2A:
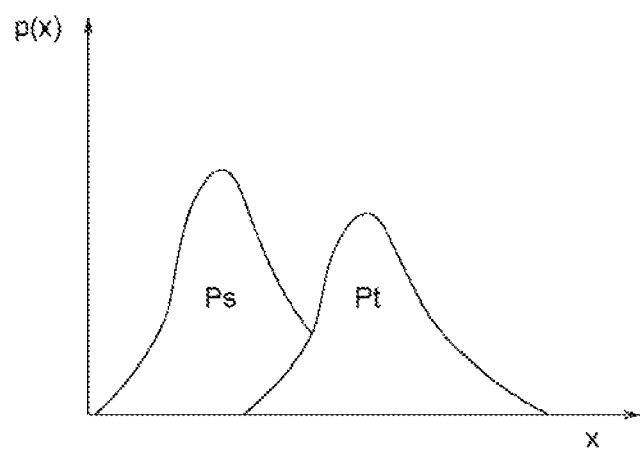
FIG. 2A is a graph illustrating the asymmetry (i.e., domain shift) of the sample distributions in the source domain and target domain without the present embodiment.
Figure 2B:
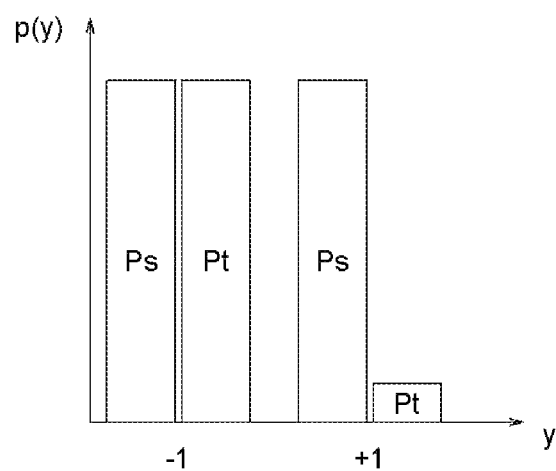
FIG. 2B is a graph illustrating the asymmetry (i.e., domain shift) of the sample distributions in the source domain and target domain without the present embodiment.

FIGS. 2A and 2B are graphs illustrating the asymmetry (i.e., domain shift) of the sample distributions in the source domain and the target domain without the present embodiment.

FIG. 2A shows the distribution of feature values $Ps(x)$ of the source samples belonging to the source domain and the distribution of feature values $Pt(x)$ of the target samples belonging to the target domain. As shown in FIG. 2A, the distribution of feature values of the target samples does not match the distribution of feature values of the source samples. In other words, the distribution of the feature values of the target samples is covariate-shifted in the positive direction with respect to the distribution of feature values of the source samples ($Ps(x) \neq Pt(x)$).

FIG. 2B shows the class-wise distribution of source samples belonging to the source domain ($Ps(y)$) and the class-wise distribution of target samples belonging to the target domain ($Pt(y)$). Referring to FIG. 2B each of the source domain and the target domain is assumed to have two classes (−1, +1).

As shown in FIG. 2B, in the source domain, the number of source samples labeled to class (−1) and the number of source samples labeled to class (+1) are approximately the same. On the other hand, in the target domain, the number of target samples labeled to class (−1) is approximately the same as the number of source samples labeled to the class (−1), whereas the number of target samples labeled to class (+1) is considerably lower than the number of source samples labeled to the class (+1), which means the target domain is also causing a shift in the class-wise distribution ($Ps(y=+1) \neq Pt(y=+1)$).

As a non-limiting example, a certain case is considered in which the source domain contains illustrative images, the target domain contains photographed images, and the domain adaptation is applied to the learning model to obtain a learned learning model that classifies an input image into one of two classes: a dog image and a cat image.

The source samples in the source domain include both dog illustrative images drawing dogs ($Ps(y=-1)$) and cat illustrative images drawing cats ($Ps(y=+1)$), and each of source samples is labeled with either the dog class (−1) or the cat class (+1).

On the other hand, as shown in FIG. 2B, assume that the target samples in the target domain is almost all the photographed images of dogs shooting dogs ($Pt(y=-1)$) while none or very few of the photographed images of cats shooting cats ($Pt(y=+1)$) have been made available.

In the inference phase in which the learning model is actually used, that is, in the phase performing the task to classify the input images, it is assumed that not only photographed images of dogs but also photographed images of cats are input, and therefore, it is required to distinguish between the photographed images of dogs and the photographed images of cats with high accuracy.

However, as shown in FIG. 2B, since the photographed images of cats ($Pt(y=+1)$) in the target domain is insufficient in number, even when the domain adaptation is applied to the learning model, the accuracy of classifying the photographed images of cats separately from the photographed images of dogs is likely to be lowered.

On the other hand, according to the present embodiment, when domain-adapting the learning model, the learning apparatus 1 generates, as pseudo-samples, photographed images of cats ($Pt(y=+1)$), which are insufficient in number in the target domain, and supplements the target domain with the generated pseudo-samples.

Figure 3A:
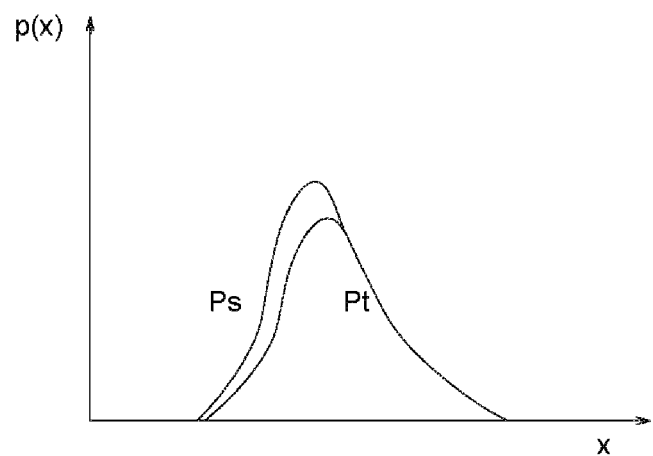
FIG. 3A is graph illustrating the source domain and target domain that have been domain-adapted through the pseudo-sample generation processing performed by the learning apparatus according to the present embodiment.
Figure 3B:
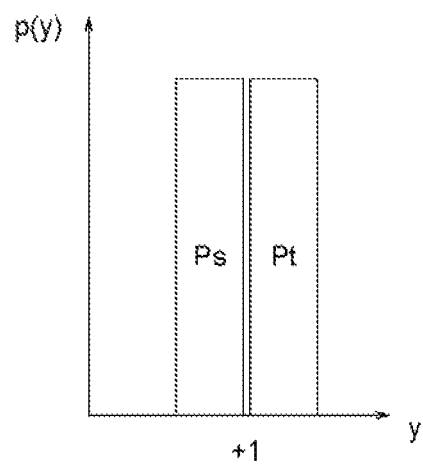
FIG. 3B is graph illustrating the source domain and target domain that have been domain-adapted through the pseudo-sample generation processing performed by the learning apparatus according to the present embodiment.

FIGS. 3A and 3B are graphs illustrating the source domain and the target domain that have been domain-adapted through the pseudo-sample generation processing performed by the learning apparatus 1 according to the present embodiment.

FIG. 3A shows the distribution of feature values of the source samples belonging to the source domain ($Ps(x)$) after being domain-adapted and the distribution of feature values of the target samples belonging to the target domain ($Pt(x)$). As shown in FIG. 3A, the distribution of the feature values of the target samples is almost identical to the distribution of the feature values of the source samples (i.e., $Ps(x) \approx Pt(x)$).

FIG. 3B shows the class-wise distribution of the class (+1) of the source samples belonging to the source domain ($Ps(y)$) and the class-wise distribution of the class (+1) of the target samples belonging to the target domain ($Pt(y)$).

Since the target domain has been supplemented with pseudo-samples generated for the class (+1) during the domain adaptation, as shown in FIG. 3B, the number of the source samples labeled to the class (+1) in the source domain and the number of the target samples labeled to the class (+1) in the target domain are almost equal (i.e., $Ps(y=+1) \approx Pt(y=+1)$).

As shown in FIGS. 3A and 3B, according to the present embodiment, it makes it possible to eliminate not only the shift in the feature value distribution but also the shift between classes, which may occur between the source domain and the target domain.

Module Configuration of Learning Model for Machine Learning

Figure 4:
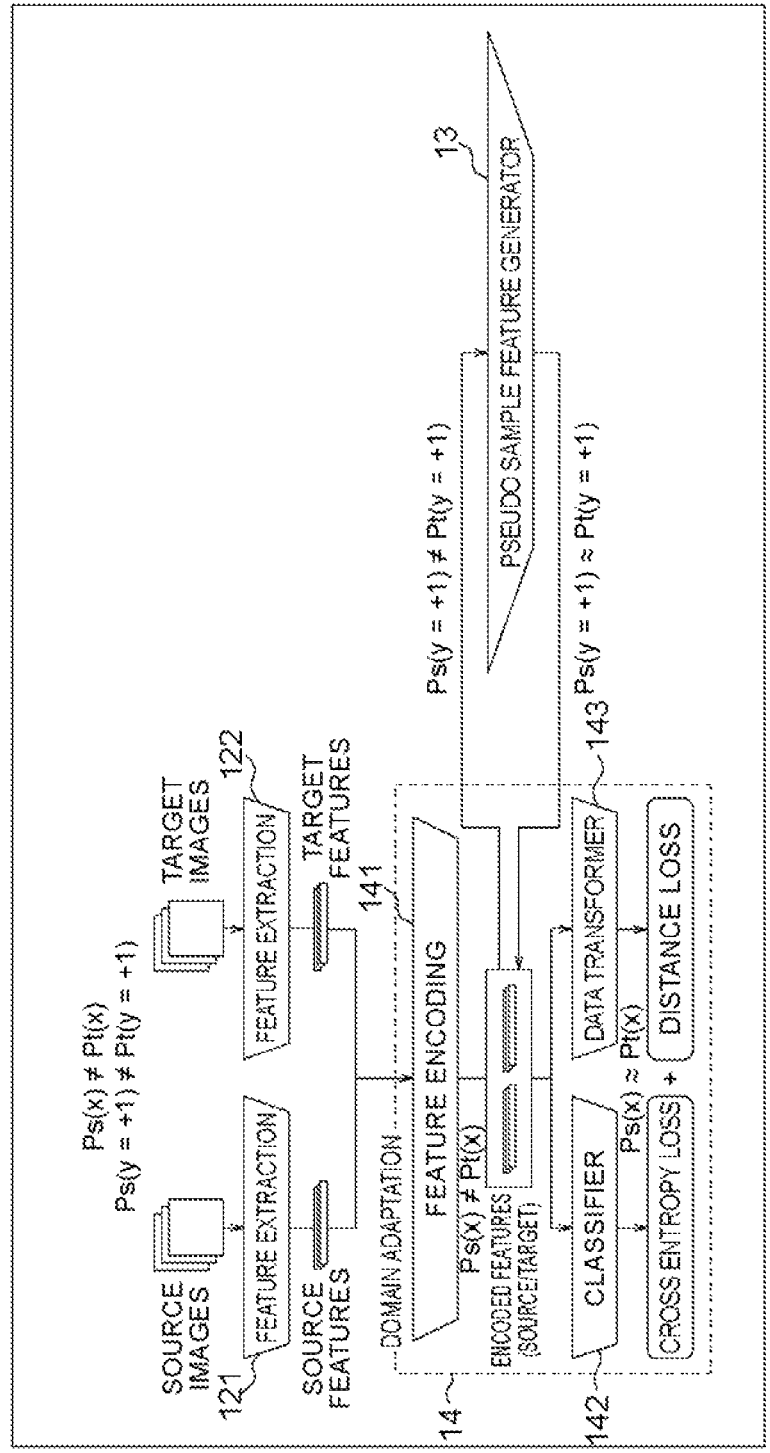
FIG. 4 is a schematic diagram showing an exemplary module structure of the learning model and an exemplary outline processing procedure thereof when the learning apparatus according to the present embodiment is implemented in machine learning.

FIG. 4 is a schematic diagram showing an exemplary module configuration and exemplary outline processing procedure when the learning apparatus 1 according to the present embodiment is implemented on a machine learning model.

Referring to FIG. 4, the learning apparatus 1 may include feature extraction modules 121 and 122, an encoding module 141, a pseudo-sample generation module (pseudo-sample feature generator) 13, a classifier module 142, and a data transformation module (data transformer) 143. Among the modules shown in FIG. 4, the encoding module 141, the pseudo-sample generation module 13, the classifier module 142, and the data transformation module 143 constitute the domain adaptation module 14 as a subsequent stage of the feature extraction modules 121 and 122.

Referring to FIG. 4, an example of training a learning model for recognizing and classifying an input image will be described.

It should be noted that the feature extraction modules 121 and 122 in FIG. 4 corresponds to the feature extraction unit 12 of the learning apparatus 1, the pseudo-sample generation module 13 corresponds to the pseudo-sample generation unit 13 of the learning apparatus 1, the domain application module 14 including the encoding module 141, the classifier module 142, and the data transformation module 143 corresponds to the data transformation unit 14 of the learning apparatus 1, respectively.

The feature extraction module 121 obtains the source images of the source domain as input, extracts features from each of the source images, and outputs the features of the source images.

Similarly, the feature extraction module 122 obtains the target images of the target domain as input, extracts features from each of the target images, and outputs the features of the target images.

It should be noted that, when training the learning model, the feature extraction modules 121 and 122 may be executed in parallel, or one of the feature extraction modules 121 and 122 may be executed first and the other may be executed subsequently in turn.

The feature extraction modules 121 and 122, which extract image features of the source images and the target images, may be configured by, for example, a Convolutional Neural Network (CNN).

The feature extraction modules 121 and 122 may further apply the data augmentation algorithms to the source images and the target images to position objects to be analyzed in the image (e.g., a human) in the center of the image at an appropriate scale, or to remove the background.

The feature extraction modules 121 and 122 may further apply the attention mechanism such as Attention Branch Network (ABN) to generate and optimize an attention map of a region of interest in the images from the source images and the target images, and weight the extracted image features.

The encoding module 141 of the domain adaptation module 14 encodes the source image features and the target image features output from the feature extraction modules 121 and 122 into a common feature space.

Here, it is assumed that the source domain contains both the positive class feature vector $zs^+$ and the negative class feature vector $zs^+$, $zs^- \in \mathbb{R}^d$).

On the other hand, it is assumed that the target domain contains only the negative class feature vector $zt^-$ (i.e., $zt^- \in \mathbb{R}^d$). In other words, the positive class is a class that has not yet appeared (i.e., not yet observed) in the target domain. Assume that these feature vectors input to the encoding module 141 are d-dimensional feature vectors.

The encoding module 141 learns the parameters of the feature space, which are domain invariant, and may be implemented in, for example, a Fully Connected Layer (FCL) as a learnable mapping function G.

The encoding module 141 outputs the encoded feature vectors $\hat{z}s^-$, $\hat{z}s^+$, and $\hat{z}t^-$. These encoded feature vectors are assumed to be m-dimensional (m<d) feature vectors ($\hat{z} \in \mathbb{R}^m$).

The pseudo-sample generation module 13, using the encoded feature vectors $\hat{z}s^-$, $\hat{z}s^+$, $\hat{z}t^-$, which are mapped into the common feature space, as input, generates pseudo-samples of the positive class that have not yet appeared in the target domain. The generated positive class pseudo-samples are assumed to be positive class feature vectors $\hat{z}t^+$ in the target domain space, and are used to supplement the samples in the target domain.

It should be noted that, in FIG. 4, the pseudo-sample generation module 13 performs the pseudo-sample generation processing after the encoding of the feature vectors by the encoding module 141, but alternatively, the pseudo-sample generation processing may be performed before the encoding of the feature vectors by the encoding module 141.

The details of the pseudo-sample generation processing by the pseudo-sample generation module will be described later with reference to FIG. 5.

In step S5, the classifier module 142 (i.e., discriminator) of the domain adaptation module 14 classifies the encoded feature vectors $\hat{z}(\hat{z} \in \mathbb{R}^m)$.

The classifier module 142 may include a domain classifier (C_d) that classifies the input encoded feature vector into either the source domain or the target domain, and a class classifier (C_c) that classifies the input encoded feature vector into either the positive class or the negative class.

The classifier module 142 may be implemented in, for example, a Fully Connected Layer (FCL) as a learnable mapping function C, which performs classification by mapping $\mathbb{R}^m$ to $\mathbb{R}^c$. In the above described domain classifier and the class classifier, c=2.

The classifier module 142 can maintain classification performance by machine learning to make the binary cross entropy loss between domains and classes smaller by, for example, using the loss function Lc to minimize the loss shown in Equation 1 below.

$$\mathcal{L}_c = -\frac{1}{n_s} \sum_{i=1}^{n_s} \sum_{j=0}^{1} \mathbb{1}(y_i^s = j) \log(C(G(z_s))_j) \quad \text{(Equation 1)}$$

Here, $y_i^s$ indicates the binary label of the i-th source sample, and $\mathbb{1}$ is the indicator function. It should be noted that the classifier module may calculate other losses, such as the squared error, instead of the binary cross entropy loss in Equation 1 above.

The data transformation module 143 of the domain adaptation module 14 transforms the encoded feature vector representation $\hat{z}$ ($\hat{z} \in \mathbb{R}^m$) into a real number z ($z \in \mathbb{R}$) such that the data discrepancy between the source domain and the target domain is minimized. In other words, the data transformation module 143 is a module that evaluates domain adaptation (i.e., domain critic module).

The data transformation module 143 may be implemented in, for example, a Fully Connected Layer (FCL) as a learnable transformation function F.

More particularly, the data transformation module 143, using the encoded feature vectors $\hat{z}s^-$, $\hat{z}s^+$ of the source domain, the encoded feature vectors $\hat{z}t^-$ of the target domain, and the pseudo-sample positive class feature vectors $\hat{z}t^+$ of the target domain as inputs, estimates the distance in the common feature space between the encoded feature vectors $\hat{s}^-$, $\hat{z}s^+$ of the source domain and the encoded feature vectors $\hat{z}t^-$, $\hat{z}t^+$ of the target domain. The data transformation module 143 machine-learns to minimize this distance so as to make the encoded feature vectors of the source domain domain-adapt to the encoded feature vectors of the target domain.

This distance may be, for example, the Wasserstein distance as the distance between probability distributions in the distance space, but the data transformation module 143 may use other distances.

The data transformation module 143 performs domain adaptation by performing machine learning to make the loss in distance smaller between sample distributions between the source domain and the target domain by using, for example, the loss function Lw to minimize the loss shown in Equation 2 below.

$$\mathcal{L}_w = \frac{1}{n_s}\sum_{z_i \in S} F(G(z_s)) - \frac{1}{n_t}\sum_{z_i \in T} F(G(z_t)) \qquad \text{(Equation 2)}$$

Here, $n_s$ denotes the number of samples of positive and negative classes in the source domain, and $n_t$ denotes the number of samples of positive and negative classes in the target domain.

According to the present embodiment, the encoded feature vectors of the pseudo-positive samples generated by the pseudo-sample generation module 13 are added to the target domain. For this reason, the data transformation module 143 can perform domain adaptation with high accuracy using the encoded feature vectors of the pseudo-positive samples added to the target domain.

When training the learning mode by the machine learning, the classifier module 142 and the data transformation module 143 may be performed in parallel, or alternatively, one of the classifier module 142 and the data transformation module 143 may be performed first and the other may be performed laser in turn. Learning by the classifier module 142 and learning by the data transformation module 143 may be performed as the adversarial learning.

The domain adaptation module 14, which trains the learning model, iterates the machine learning processing such that the parameters of the mapping function G, the mapping function C, and the transformation function F are optimized to minimize the total loss of the above loss functions. As a result, the parameters of the common feature space, which are domain invariant, are learned, so that the positive and negative sample distributions in the feature space of the source domain are domain adapted to the positive and negative sample distributions in the feature space of the target domain with high accuracy.

It should be noted that the module configuration of the learning model shown in FIG. 4 is no more than an example, and the learning apparatus 1 according to the present embodiment may use other methods of feature extraction and domain adaptation.

Detailed Processing Procedure of Pseudo-sample Generation Processing

FIG. 5 is a flowchart showing an exemplary detailed processing procedure of the pseudo-sample generation processing performed by the pseudo-sample generation unit 13 of the learning apparatus 1 according to the present embodiment.

It should be noted that each step in FIG. 5 may be implemented by the CPU reading and executing the program stored in the memory of the learning apparatus 1. Alternatively, at least a part of the flowchart shown in FIG. 5 may be implemented by hardware. In the case of hardware implementation, for example, a dedicated circuit can be automatically generated on a Field Programmable Gate Array (FPGA) from the program to execute each step by using a predetermined compiler. Alternatively, a gate array circuit can be formed in the same way as the FPGA and implemented as hardware. It can also be implemented by an Application Specific Integrated Circuit (ASIC).

In step S51, the pseudo-sample generation unit 13 of the learning apparatus 1 pre-trains the domain classifier that classifies a sample into either the source domain or the target domain. The domain classifier is trained to assign a higher weight to the samples classified into the target domain than to the samples classified into the source domain.

In step S51, the pseudo-sample generation unit 13 may further pre-train the class classifier that classifies a sample into either the positive class or the negative class. The class classifier is trained to assign a higher weight to the samples classified into the positive class than to the samples classified into the negative class.

In step S52, the pseudo-sample generation unit 13 of the learning apparatus 1 estimates the confidence score of the negative class samples of the target domain from the distribution of the negative class samples of the target domain in the feature space.

More particularly, the pseudo-sample generation unit 13 estimates the mean vector and the covariance matrix of the distribution of the negative class samples of the target domain in the feature space, and estimates the negative class sample probability value with respect to the distribution of the negative class samples of the target domain as the confidence score of the negative class samples of the target domain. Here, the distribution of the negative class samples can be regarded as a Gaussian distribution (i.e., normal distribution).

In step S53, the pseudo-sample generation unit 13 of the learning apparatus 1 generates positive class pseudo-samples in a region of the target domain in the feature space.

Assuming that the confidence score of the negative class samples of the target domain in the feature space, which is estimated in step S52, is $p(Dt^-|x^+)$, the confidence score of the positive class pseudo-samples of the target domain in the feature space can be estimated as Equation 3 below.

$$p(Dt^+|x^+) = 1 - p(Dt^-|x^+) \qquad \text{(Equation 3)}$$

More particularly, the pseudo-sample generation unit 13 generates the positive class pseudo-samples of the target domain uniformly around a region in the target domain in which the confidence score of the negative class samples is low, based on the gradient of the confidence score of the negative class samples of the target domain in the feature space.

The pseudo-sample generation unit 13 may generate the positive class pseudo-samples in a region of the target domain which is determined based on the mean and standard deviation of the inter-class distances of the positive class samples and the negative class samples in the source domain.

In other words, the inter-class distance between the positive class samples and the negative class samples in the source domain can be assumed to be equal to the inter-class distance between the positive class samples and the negative class samples in the target domain. For this reason, the pseudo-sample generation unit 13 may generate the positive class pseudo-samples of the target domain in a region that is distant by the above described inter-class distance from a region in which the negative class samples of the target domain are distributed.

The pseudo-sample generation unit 13 may also generate the same number of the positive class pseudo-samples in a region of the target domain as the number of positive class samples of the source domain ($Nt^+=Ns^+$). The domain classifier (C_d) classifies the generated positive class pseudo-samples into the target domain.

In step S54, the pseudo-sample generation unit 13 of the learning apparatus 1 estimates the mean vector and the covariance matrix of the distribution of the positive class samples of the source domain in the feature space, and estimates the positive class sample probability value with respect to the distribution of the positive class samples of the source domain as the confidence score of the positive class samples of the source domain. Here, the distribution of the positive class samples can also be regarded as a Gaussian distribution (i.e., normal distribution).

Similarly to step S53, the pseudo-sample generation unit 13 generates positive class pseudo-samples of the target domain uniformly around a region of the source domain in which the confidence score of the positive class samples is low, based on the gradient of the confidence score of the positive class samples of the source domain in the feature space.

The class (content) classifier (C_c) may update the confidence score of the positive class pseudo-sample using the confidence score $p(Ds^+|x^+)$ of the positive class samples of the source domain.

In step S55, the pseudo-sample generation unit 13 of the learning apparatus 1 updates the weight of the sample by combining the confidence score of the negative class samples of the target domain and the confidence score of the positive class samples of the source domain using the domain classifier and the class classifier trained in step S51. The confidence score of the negative class samples of the target domain is converted to the confidence score of the positive class samples of the target domain, as shown in Equation 3.

Here, the samples classified into the positive class (y=+1) have higher weights. It is assumed that the distribution of positive samples in the source domain ($Ds^+$) and the distribution of positive samples in the target domain ($Dt^+$) are conditionally independent, as shown in Equation 4 below.

$$p(Ds^+,Dt^+|x^+)=p(Ds^+|x^+)p(Dt^+|x^+) \quad \text{(Equation 4)}$$

In step S56, the pseudo-sample generation unit 13 of the learning apparatus 1 calculates the parameter distribution of the samples to which the higher weight is assigned in step S55, and resamples the positive class pseudo-samples of the target domain in the feature space.

More particularly, the pseudo-sample generation unit 13, using the confidence score as a weight, increases the number of samples (i.e., up-samples) in the region of the positive class pseudo-samples with higher confidence score and decreases the number of samples (i.e., down-samples) in the region of positive class pseudo-samples with lower confidence score.

In step S57, the pseudo-sample generation unit 13 of the learning apparatus 1 iterates the processing from step S51 to step S56 until the predetermined convergence condition is reached.

As a convergence condition, for example, when the processing of step S54 to step S55 is bypassed and the information of the positive class samples of the source domain is not used, the processing shown in FIG. 5 may be regarded as convergence by iterating the processing a predetermined number of times.

Alternatively, when using the information of the positive class samples of the source domain, the convergence condition may be set by the number of iterations. For example, a distance threshold may be set, and the convergence condition may be set by the fact that the distance between the distributions of the positive class samples and negative class samples of the source domain and the distance between the distributions of the positive class samples and negative class samples in the target domain converge within the set distance threshold. In addition, instead of the distance between the distributions of the samples, the distance between the confidence scores of the samples may be used. Here, for example, the Jensen-Shannon divergence can be used as the distance.

Figure 6A:
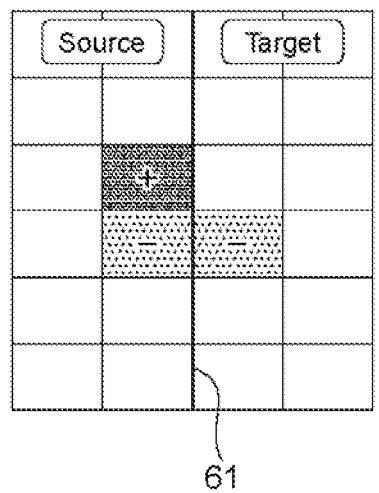
FIG. 6A is a schematic diagram illustrating an exemplary procedure for generating pseudo-samples of the target domain from samples of the target and source domains in the feature space.
Figure 6B:
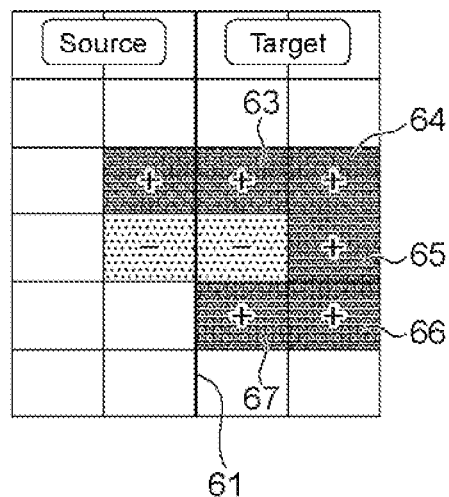
FIG. 6B is a schematic diagram illustrating an exemplary procedure for generating pseudo-samples of the target domain from samples of the target and source domains in the feature space.
Figure 6C:
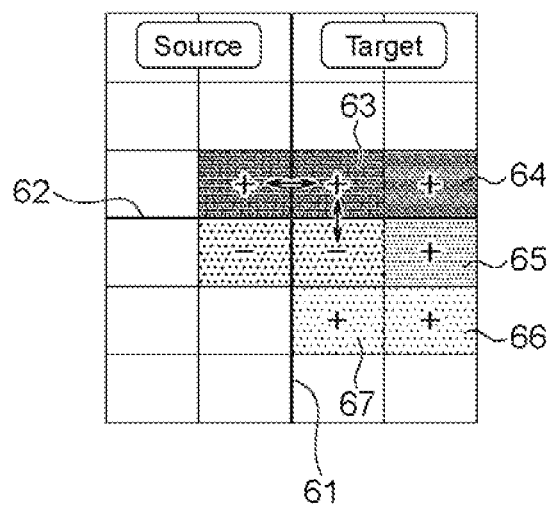
FIG. 6C is a schematic diagram illustrating an exemplary procedure for generating pseudo-samples of the target domain from samples of the target and source domains in the feature space.

FIGS. 6A to 6C are schematic diagrams illustrating an exemplary processing procedure for generating positive class pseudo-samples of the target domain from samples of the target domain and the source domain in the feature space.

Referring to FIG. 6A, in the feature space, the left side shows the region of the source domain and the right side shows the region of the target domain. The vertical line 61 indicates the boundary between the source domain and the target domain in the feature space defined by the domain classifier.

The region of the source domain includes the distribution of negative class samples indicated by (−) and the distribution of positive class samples indicated by (+) above the distribution of the negative class samples. On the other hand, the region of the target domain includes the distribution of negative class samples indicated by (−), but the distribution of positive class samples does not appear.

Referring to FIG. 6B, the pseudo-sample generation unit 13 of the learning apparatus 1 generates the positive class pseudo-samples in the region of the target domain in the feature space. In the region of the target domain on the right of the boundary 61, the distribution of negative class samples indicated by (−) indicates that the region has a high confidence score of the negative class samples of the target domain.

The pseudo-sample generation unit 13 determines that the further away from the distribution of the negative class samples indicated by (−) in the target domain, the lower the confidence score of the negative class samples in the target domain, and thus the higher the confidence score of the positive class pseudo-samples in the target domain. The pseudo-sample generation unit 13 generates a plurality of regions 63 to 67 of the positive class pseudo-samples uniformly around the distribution of the negative class samples indicated by (−) in the target domain (step S53 in FIG. 5).

Referring to FIG. 6C, the pseudo-sample generation unit 13 of the learning apparatus 1 resamples the positive class pseudo-samples in the region of the target domain in the feature space. The horizontal line 62 indicates the boundary between the positive class and the negative class as defined by the class classifier.

Among a plurality of regions 63 to 67 of the positive class pseudo-samples generated in the target domain in FIG. 6B, the pseudo sample generation unit 13 determines that the region 63, which is closer in distance to the distribution of positive class samples indicated by (+) in the source domain, is the region with higher confidence score for the positive class pseudo-samples, and assigns a higher weight to the region 63.

On the other hand, among a plurality of regions 63 to 67 of the positive class pseudo-samples, regions 64 to 67 of which distance is farther from the distribution of the positive class samples indicated by (+) in the source domain are determined to be regions with lower confidence score for the positive class pseudo-samples, and are assigned lower weights. The regions 65 to 67 of the positive class pseudo-samples below the horizontal line 62 may be assigned even lower weights than the regions of the positive class pseudo-samples above the horizontal line 62 because the regions 65 to 67 are determined by the class classifier to be negative class regions. Alternatively, the positive class pseudo-samples in the regions 65 to 67 may be removed.

The pseudo-sample generation unit 13 may eventually generate the positive class pseudo-samples in the region 63 of the positive class pseudo-samples for which a higher confidence score has been calculated.

Figure 7A:
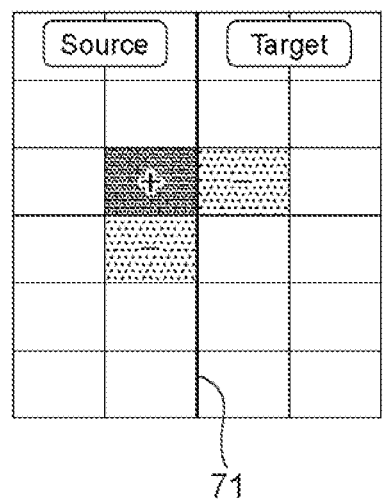
FIG. 7A is a schematic diagram illustrating another exemplary procedure for generating pseudo-samples of the target domain from samples of the target and source domains in the feature space.
Figure 7B:
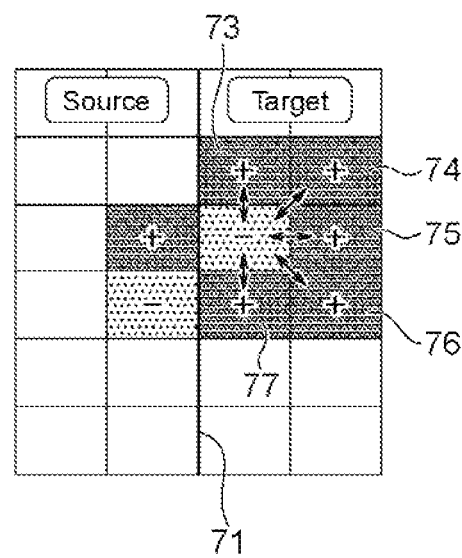
FIG. 7B is a schematic diagram illustrating another exemplary procedure for generating pseudo-samples of the target domain from samples of the target and source domains in the feature space.
Figure 7C:
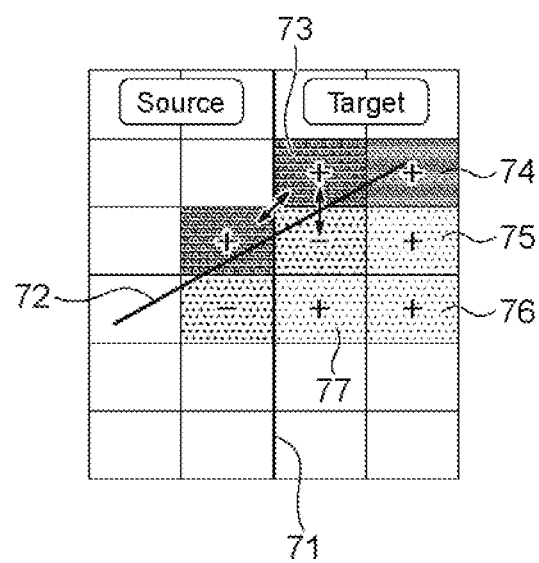
FIG. 7C is a schematic diagram illustrating another exemplary procedure for generating pseudo-samples of the target domain from samples of the target and source domains in the feature space.

FIGS. 7A to 7C are schematic diagrams illustrating another exemplary processing procedure for generating positive class pseudo-samples of the target domain from samples of the target domain and the source domain in the feature space.

Referring to FIG. 7A, in the feature space, the left side shows the region of the source domain and the right side shows the region of the target domain. The vertical line 71 indicates the boundary between the source domain and the target domain in the feature space defined by the domain classifier.

The region of the source domain includes the distribution of negative class samples indicated by (−) and the distribution of positive class samples indicated by (+) above the distribution of the negative class samples. On the other hand, the region of the target domain includes the distribution of negative class samples indicated by (−), but the distribution of positive class samples does not appear.

However, in FIG. 7A, unlike FIG. 6A, the distribution of the negative class samples indicated by (−) in the target domain is, as separated by the boundary 71 therebetween, closer to the distribution of the positive class samples indicated by (+) in the source domain than to the distribution of negative class samples indicated by (−) in the source domain.

Referring to FIG. 7B, the pseudo-sample generation unit 13 of the learning apparatus 1 generates the positive class pseudo-samples in the region of the target domain in the feature space. In the region of the target domain on the right of the boundary 71, the distribution of negative class samples indicated by (−) indicates that the region has a high confidence score of the negative class samples of the target domain.

The pseudo-sample generation unit 13 determines that the further away from the distribution of the negative class samples indicated by (−) in the target domain, the lower the confidence score of the negative class samples in the target domain, and thus the higher the confidence score of the positive class pseudo-samples in the target domain. The pseudo-sample generation unit 13 generates a plurality of regions 73 to 77 of the positive class pseudo-samples uniformly around the distribution of the negative class samples indicated by (−) in the target domain (step S53 in FIG. 5).

Referring to FIG. 7C, the pseudo-sample generation unit 13 of the learning apparatus 1 resamples the positive class pseudo-samples in the region of the target domain in the feature space. The oblique line 72 indicates the boundary between the positive class and the negative class as defined by the class classifier.

Among a plurality of regions 73 to 77 of the positive class pseudo-samples generated in the target domain in FIG. 7B, the pseudo-sample generation unit 13 determines that the region 73, which is closer in distance to the distribution of positive class samples indicated by (+) in the source domain, is the region with higher confidence score for the positive class pseudo-samples, and assigns a higher weight to the region 73.

On the other hand, among a plurality of regions 73 to 77 of the positive class pseudo-samples, regions 74 to 77 of which distance is farther from the distribution of the positive class samples indicated by (+) in the source domain are determined to be regions with lower confidence score for the positive class pseudo-samples, and are assigned lower weights. The regions 75 to 77 of the positive class pseudo-samples below the oblique line 72 may be assigned even lower weights than the regions of the positive class pseudo-samples above the horizontal line 72 because the regions 75 to 77 are determined by the class classifier to be negative class regions. Alternatively, the positive class pseudo-samples in the regions 75 to 77 may be removed.

The pseudo-sample generation unit 13 may eventually generate the positive class pseudo-samples in the region 73 of the positive class pseudo-samples for which a higher confidence score has been calculated.

Hardware Configuration of Learning Apparatus

Figure 8:
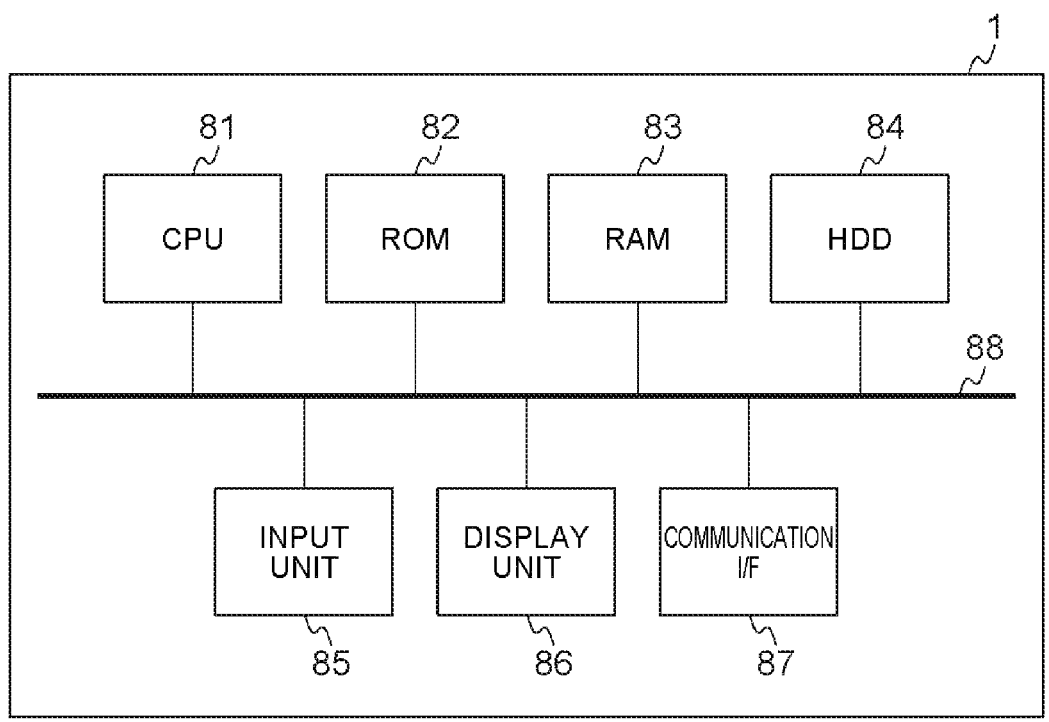
FIG. 8 is a block diagram showing an exemplary hardware configuration of a learning apparatus according to the present embodiment.

FIG. 8 is a diagram showing a non-limiting example of the hardware configuration of the learning apparatus 1 according to the present embodiment.

The learning apparatus according to the present embodiment can be implemented on any one or more computers, mobile devices, or any other processing platform.

Referring to FIG. 8, an example of the learning apparatus 1 being implemented in a single computer is shown, but the learning apparatus 1 may be implemented in a computer system that includes a plurality of computers. The plurality of computers may be inter-communicatively connected by a wired or wireless network.

As shown in FIG. 8, the learning apparatus 1 may include a CPU 81, a ROM 82, a RAM 83, an HDD 84, an input unit 85, a display unit 86, a communication I/F 87, and a system bus 88. The learning apparatus 1 may also include an external memory.

The CPU (Central Processing Unit) 81 comprehensively controls operations in the learning apparatus 1, and controls each of components (82 to 87) via the system bus 88, which is a data transmission path.

The learning apparatus 1 may also include a GPU (Graphics Processing Unit). The GPU has a higher computational capability than a CPU 81 and provides higher processing performance by running multiple or many GPUs in parallel, especially for applications such as image processing that uses the machine learning, such as this embodiment. The GPU typically includes a processor and a shared memory. Each of the processors of the GPUs fetches data from the high-speed shared memory and executes a common program to perform a large number of similar computational operations at high speed.

The ROM (Read Only Memory) 82 is a non-volatile memory that stores the control program or the like necessary for the CPU 81 to execute the processing. The control program may be stored in a non-volatile memory such as the HDD (Hard Disk Drive) 84, an SSD (Solid State Drive), or in an external memory such as a removable storage medium (not shown).

The RAM (Random Access Memory) 83 is a volatile memory and functions as the main memory, work area, and the like of the CPU 81. In other words, the CPU 81 loads the necessary program or the like from the ROM 82 into the RAM 83 for execution of processing and executes the program or the like to realize various functional operations.

The HDD 84 stores, for example, various data, various information and the like necessary for the CPU 81 to perform processing using the program. The HDD 84 also stores, for example, various data, various information and the like obtained by the CPU 81 performing processing using the program and the like.

The input unit 85 is constituted with a keyboard, mouse, or other pointing device.

The display unit 86 is constituted with a monitor such as a liquid crystal display (LCD). The display unit 86 may provide a Graphical User Interface (GUI), which is a user interface for instructing and inputting various parameters used in the machine learning processing and communication parameters used in communication with other devices to the learning apparatus 1.

The communication I/F 87 is an interface that controls communication between the learning apparatus 1 and an external device.

The communication I/F 87 provides an interface with the network and executes communication with external devices via the network. Various data, various parameters, and the like are sent and received to and from the external device via the communication I/F 87. According to the present embodiment, the communication I/F 87 may execute communication via a wired LAN (Local Area Network) or a dedicated line that conforms to a communication standard such as Ethernet (registered trademark). However, the network available in the present embodiment is not limited to this, and may be configured by a wireless network. This wireless network includes wireless PAN (Personal Area Network) such as Bluetooth (registered trademark), ZigBee (registered trademark), and UWB (Ultra Wide Band). It also includes wireless LAN (Local Area Network) such as Wi-Fi (Wireless Fidelity) (registered trademark) and wireless MAN (Metropolitan Area Network) such as WiMAX (registered trademark). It also includes wireless WAN (Wide Area Network) such as LTE/3G, 4G, and 5G. The network should be able to connect and communicate with each other, and the standard, scale, and configuration of the communication are not limited to the above.

The functions of at least some of the elements of the learning apparatus 1 shown in FIG. 1 can be realized by the CPU 81 executing a program. However, at least some of the functions of each element of the learning apparatus 1 shown in FIG. 1 may be operated as dedicated hardware. In this case, the dedicated hardware operates based on the control of the CPU 81.

As described above, according to the present embodiment, the learning apparatus extracts the features of the sample of the source domain and the sample of the target domain, respectively, and generates, as a pseudo-sample, a sample of a class that is not sufficiently included in the target domain, among a plurality of classes labeled to the sample of the source domain, in the region of the target domain in the feature space, and supplements the samples of the target domain with the generated pseudo-sample.

The learning apparatus according to the present embodiment also machine learns such that the source domain domain-adapts to the target domain to which the pseudo-sample is supplemented.

Accordingly, even when the samples in the source domain do not correspond sufficiently to the samples in the target domain, highly accurate processing results can be obtained.

For example, even in the task of detecting anomaly scenes that appear only infrequently in a video, it makes it possible to generate the pseudo-samples of the anomaly scenes to be filtered and supplement the target domain with the generated pseudo-samples. Thus, the asymmetry between the classes of the source domain and the target domain is eliminated.

As a result, it makes it possible to achieve the domain adaptation with higher accuracy, which contributes to improving the availability of machine learning models.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Learning Apparatus; 2: Source Data Set; 3: Target Data Set; 11: Data Acquisition Unit; 12: Feature Extraction Unit; 13: Pseudo-Sample Generation Unit; 14: Data Transformation Unit; 15: Inferencing Unit; 81: CPU; 82: ROM; 83: RAM; 84: HDD; 85: Input Unit; 86: Display Unit; 87: Communication I/F; 88: Bus; 122: Source Feature Extraction Module; 122: Target Feature Extraction Module; 141: Encoder (Future Encoding Module); 142: Classifier; 143: Data Transformation Module (Data Transformer)

What is claimed is:

1. An information processing apparatus, comprising:
at least one memory; and
electric circuitry including at least one of a field programmable gate array (FPGA), an application specific integrated circuit (ASIC), and at least one processor configured to read and operate according to program code stored on the at least one memory, the electric circuitry configured to:
extract features from a sample of a first class and a sample of a second class contained in a source domain, and a sample of the first class contained in a target domain, respectively, each domain containing at least one sample, each sample having a class, the second class being different from the first class;

generate pseudo-samples of the second class in the target domain based on a distribution of samples of the first class contained in the target domain in a feature space of the extracted features; and perform data transformation in the feature space by machine learning such that a distribution of samples of the first class and samples of the second class contained in the source domain approximates a distribution of samples of the first class and the pseudo-samples of the second class contained in the target domain, wherein the pseudo-samples of the target domain are configured to supplement the samples of the target domain in a domain adaptation of a machine learning model from the source domain to the target domain, the electric circuitry is further configured to estimate a first confidence score of the distribution of samples of the first class contained in the target domain in the feature space, and generates the pseudo-samples based on a gradient of the estimated first confidence score, the electric circuitry is further configured to estimate a second confidence score of the distribution of samples of the second class contained in the source domain in the feature space, and generates the pseudo-samples based on a gradient of the estimated second confidence score, and the electric circuitry is further configured to combine the first confidence score and the second confidence score, and to resample the generated pseudo-samples based on a combined confidence score so as to distribute the resampled pseudo-samples in a region having a higher combined confidence score in the feature space.

2. The information processing apparatus according to claim 1, wherein
the electric circuitry is further configured to generate the pseudo-samples in a region of the feature space where the estimated first confidence score is low.

3. The information processing apparatus according to claim 1, wherein
the electric circuitry is further configured to generate the pseudo-samples based on a distance in the feature space between the distribution of samples of the first class contained in the source domain and the distribution of samples of the second class contained in the source domain.

4. The information processing apparatus according to claim 1, further comprising:
a domain classifier configured to classify a sample into one of the source domain and the target domain, wherein
the electric circuitry is further configured to train the domain classifier to assign a higher weight to the sample classified in the target domain than to the sample classified in the source domain.

5. The information processing apparatus according to claim 4, further comprising:
a class classifier configured to classify a sample into one of the first class and the second class, wherein
the electric circuitry is further configured to train the class classifier to assign a higher weight to the sample classified in the second class than to the sample classified in the first class.

6. The information processing apparatus according to claim 5, wherein
the electric circuitry is further configured to train at least one of the domain classifier and the class classifier by machine learning such that a cross entropy loss in the feature space, which is calculated using a first loss function, becomes smaller.

7. The information processing apparatus according to claim 1, wherein
the electric circuitry is further configured to perform machine learning such that a Wasserstein distance between the source domain and the target domain in the feature space, which is calculated using a second loss function, becomes smaller.

8. An information processing method executed by an information processing apparatus, comprising:
extracting features from a sample of a first class and a sample of a second class contained in a source domain, and a sample of the first class contained in a target domain, respectively, each domain containing at least one sample, each sample having a class, the second class being different from the first class;

generating pseudo-samples of the second class in the target domain based on a distribution of samples of the first class contained in the target domain in a feature space of the extracted features; and performing data transformation in the feature space by machine learning such that a distribution of samples of the first class and samples of the second class contained in the source domain approximates a distribution of samples of the first class and the pseudo-samples of the second class contained in the target domain, wherein the pseudo-samples of the target domain are configured to supplement the samples of the target domain in a domain adaptation of a machine learning model from the source domain to the target domain, estimating a first confidence score of the distribution of samples of the first class contained in the target domain in the feature space, and generating the pseudo-samples based on a gradient of the estimated first confidence score, estimating a second confidence score of the distribution of samples of the second class contained in the source domain in the feature space, and generating the pseudo-samples based on a gradient of the estimated second confidence score, and combining the first confidence score and the second confidence score, and resampling the generated pseudo-samples based on a combined confidence score so as to distribute the resampled pseudo-samples in a region having a higher combined confidence score in the feature space.

9. A non-transitory machine-readable storage medium containing instructions that, when executed, cause a processor of a programmable device to perform operations comprising:
a feature extraction process for extracting features from a sample of a first class and a sample of a second class contained in a source domain, and a sample of the first class contained in a target domain, respectively, each domain containing at least one sample, each sample having a class, the second class being different from the first class;

a pseudo-sample generation process for generating pseudo-samples of the second class in the target domain based on a distribution of samples of the first class contained in the target domain in a feature space of the features extracted by the feature extraction process; and a data transformation process for performing data transformation in the feature space by machine learning such that a distribution of samples of the first class and samples of the second class contained in the source domain approximates a distribution of samples of the first class and the pseudo-samples of the second class contained in the target domain, wherein the pseudo-samples of the target domain are configured to supplement the samples of the target domain in a domain adaptation of a machine learning model from the source domain to the target domain, a first confidence score estimation process for estimating a first confidence score of the distribution of samples of the first class contained in the target domain in the feature space, and for generating the pseudo-samples based on a gradient of the estimated first confidence score, a second confidence score estimation process for estimating a second confidence score of the distribution of samples of the second class contained in the source domain in the feature space, and for generating the pseudo-samples based on a gradient of the estimated second confidence score, and a combination process for combining the first confidence score and the second confidence score, and for resampling the generated pseudo-samples based on a combined confidence score so as to distribute the resampled pseudo-samples in a region having a higher combined confidence score in the feature space.

* * * * *